Patented Sept. 12, 1950

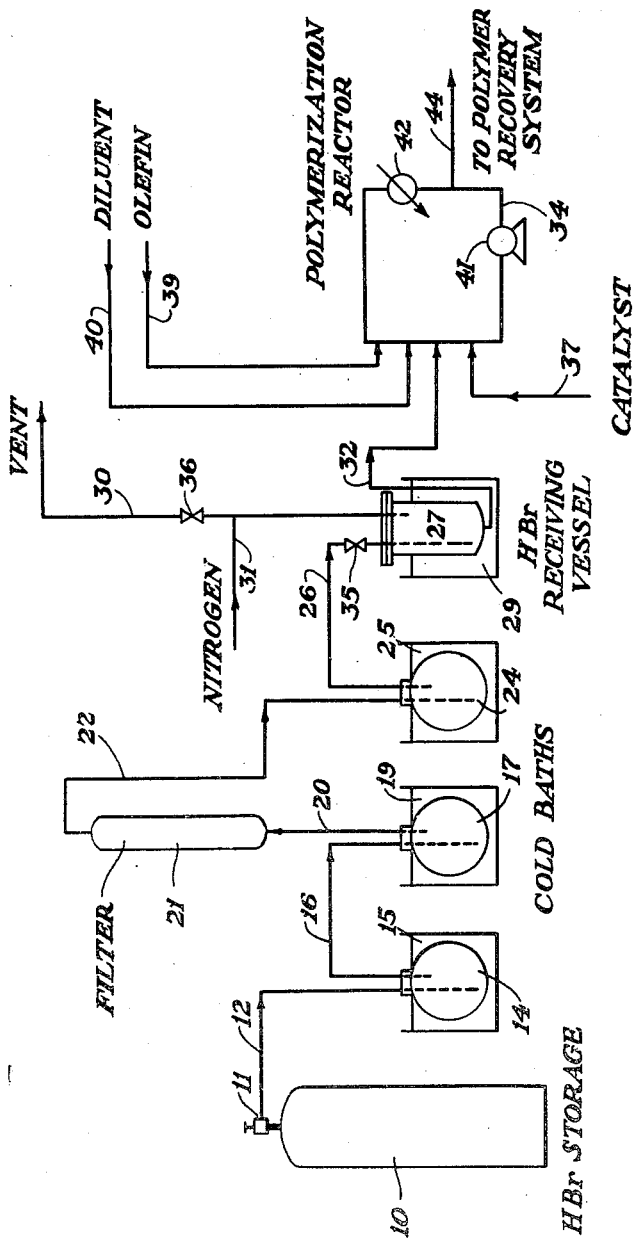

2,521,939

UNITED STATES PATENT OFFICE 2,521,939

CATALYTIC POLYMERIZATION OF OLEFINS WITH HYDROGEN BROMIDE PROMOTER

Dominic J. Oriolo, Woodbury, N. J., assignor to Socony-Vacuum Oil Company, Incorporated, a corporation of New York Application May 22, 1948, Serial No. 28,615

1 Claim. (Cl. 260—683.15)

This invention relates to the catalytic polymerization of olefins and relates more particularly to processes for the polymerization of olefins with a metal halide catalyst where the activity of the catalyst is enhanced by means of hydrogen bromide promoter.

It is well known that olefins, such as propylene, the butenes, the pentenes, etc., may be polymerized in the presence of catalysts such as the metal halides to produce polymer products having viscosities which make them useful as lubricating oils or as blending agents for lubricating oils. It is also known that the activity of the metal halide catalysts may be enhanced by employing a catalyst promoting agent whereby the viscosity of the polymer product may be increased. Thus, hydrogen bromide has been employed as a catalyst promoting agent for aluminum bromide catalyst in the polymerization of various types of olefins for the purpose of obtaining polymer products of higher viscosity.

It is an object of this invention to increase the promoting effect of hydrogen bromide promoter in olefin polymerization reactions. It is a further object of this invention to increase the viscosity of olefin polymer products obtained by the polymerization of olefins in the presence of metal halide catalyst and hydrogen bromide promoter. It is another object of the invention to obtain polymer products of clear, bright color. It is another object of this invention to provide an improved olefin polymerization process. It is another object of this invention to provide an olefin polymerization process whereby erratic results with respect to the viscosity of the polymer product are minimized. Further objects of the invention will become apparent from the following description thereof.

In accordance with the invention, olefins are polymerized in the presence of metal halide catalyst and hydrogen bromide promoter by a process which includes as its essential step the treatment of the hydrogen bromide promoter to remove iron bromide therefrom just prior to addition to the polymerization reaction mixture.

It has been discovered that, in the polymerization of olefins with metal halide catalyst and hydrogen bromide promoter, pretreatment of the hydrogen bromide promoter to remove impurities, particularly iron bromide, therefrom prior to addition of the promoter to the polymerization reaction mixture results in a marked increase in the viscosity of the polymer product obtained. It has further been discovered that, by such pretreatment of the hydrogen bromide promoter prior to addition to the polymerization reaction mixture, under fixed polymerization reaction conditions of temperature, catalyst concentration, hydrogen bromide concentration, etc., uniform results with respect to the viscosity of the polymer product are obtained. Additionally, polymer products of uniformly clear, bright appearance are obtained. Evidently, impurities, particularly iron bromide, although in small or even minute amount, have a poisoning effect on the activity of the hydrogen bromide promoter reducing the viscosity of the polymer product, and the poisoning effect varies with the amount of impurities in the hydrogen bromide promoter giving rise to erratic results in the viscosity of the polymer product despite uniform reaction conditions of temperature, catalyst concentration, and promoter concentration. Additionally, the impurities affect the color of the polymer product, producing polymers of dark hue. By the process of the invention, these adverse effects are not encountered.

In the commercial manufacture of hydrogen bromide, iron or iron alloy equipment is employed, and by reaction of the hydrogen bromide with the iron, iron bromide is formed. By the procedures of manufacture, even though this iron bromide may be largely removed, particular attention may not be paid to removing the last traces of this impurity. Further, hydrogen bromide is stored and shipped in iron or iron alloy pressure cylinders and, during the time the hydrogen bromide is in such cylinders, reaction takes place to produce iron bromide. Thus, while hydrogen bromide comparatively free of deleterious impurities may be produced, by the time it has been received for use in olefin polymerization reactions sufficient impurities will be contained therein to adversely affect the quality of the polymer products. By purification just prior to use in polymerization reactions, these impurities are removed and sufficient time does not elapse to permit reaction of the hydrogen bromide in contact with iron surfaces to form new iron bromide.

For purifying the hydrogen bromide, any suitable procedure may be employed. Preferably, the hydrogen bromide is treated by subjecting it to distillation, and preferably, to distillation in glass or other material not readily reactive with or attacked by hydrogen bromide. Since hydrogen bromide is customarily obtained commercially in cylinders under pressure, purification treatment may be conveniently effected by flash distillation at atmospheric temperatures. A plurality of flash distillations, with successive reduction in pressure, is employed to insure maximum removal of impurities. However, distillation by the application of heat, at atmospheric, sub-atmospheric, or super-atmospheric pressures is satisfactory. Following purification, it is preferred to use the hydrogen bromide immediately to prevent the formation of fresh impurities. In this connection, the hydrogen bromide purification operation may be carried out jointly with the olefin polymerization reaction. This may be done by passing the hydrogen bromide from the pressure cylinder or other source of supply as a feed stream for the polymerization reactor to the purification operation, such as a distillation operation, and directly from the purification operation to the polymerization reaction zone. Thus, the purification operation may be made a component part of the polymerization process.

Hydrogen bromide promoter is ordinarily employed with metal bromide catalysts although it may also be employed with metal chloride or other metal halide catalysts. Its use is particularly effective with aluminum bromide catalyst, particularly aluminum bromide catalyst employed in solution in a saturated hydrocarbon. It may also be used with mixed metal halide catalysts, as a mixed aluminum bromide-aluminum chloride catalyst.

The process of the invention is applicable in processes for the polymerization of any type of olefin where hydrogen bromide promoter is employed. Such processes include the polymerization of propylene, 1-butene, 2-butene, the isomeric pentenes, hexenes, etc. Other processes include the polymerization of diolefins, the copolymerization of two dissimilar mono-olefins such as the copolymerization of propylene and a butene, or the interpolymerization of a mono-olefin with a diolefin.

The accompanying drawing is a flow sheet schematically illustrating one embodiment of the invention.

Referring now to the drawing, hydrogen bromide from a storage cylinder 10 provided with a valve 11 is led through line 12 to flask 14 maintained at a suitably low temperature, such as about $-40°$ F. for example, by means of cooling bath 15. High boiling material such as iron bromide is entrained in the flask and the hydrogen bromide is passed overhead through line 16 to flask 17 maintained at a low temperature by means of cooling bath 19. Preferably, flask 17 is maintained at a lower temperature than flask 14, such as a temperature of $-60°$ F., for example. Further high boiling material is entrained in flask 17, and the hydrogen bromide is passed overhead through line 20 to filter 21 packed with a material such as glass wool to entrap any solid material which may be contained in the hydrogen bromide. The hydrogen bromide is then passed through line 22 to flask 24. Flask 24 is maintained at a low temperature by means of cooling bath 25 and preferably this temperature is lower than the temperature of flask 17, for example, about $-75°$ F. The hydrogen bromide is passed from flask 24 through line 26 to receiving vessel 27 where it is maintained at a temperature of about $-110°$ F. by means of bath 29. Receiving vessel 27 may be maintained at substantially atmospheric pressure by being vented to the atmosphere through line 30. To prevent contamination of the hydrogen bromide with air, a slight positive pressure of dry nitrogen is maintained in the flask by passing nitrogen into line 30 from line 31. The baths 15, 19, and 25 may be, suitably, mixtures of solidified carbon dioxide and kerosene or solidified carbon dioxide and acetone.

The hydrogen bromide in receiving vessel 27 is passed through line 32 to polymerization reactor 34 which may be of the reactor loop type. Passage of the hydrogen bromide to the reactor may be accomplished by closing valve 35 in line 26 and valve 36 in line 30 and forcing the hydrogen bromide from the vessel by means of superimposed pressure of nitrogen from line 31.

An olefin polymerization catalyst, such as aluminum bromide dissolved in a suitable solvent such as normal butane or other low boiling saturated hydrocarbon, is passed into the reactor through line 37. An olefin such as propylene enters the reactor through line 39 and a diluent such as normal butane or other low boiling saturated hydrocarbon enters the reactor through line 40. The reaction mixture is continuously circulated within the reactor 34 by means of pump 41, a suitably low temperature for the polymerization reaction being maintained by means of cooler 42. A stream of reaction mixture is continuously withdrawn from the reactor through line 44 and passed to a system for the recovery of the desired polymer product.

Polymer product may be recovered from the reactor by any suitable, conventional procedure. For example, the stream of reaction mixture from line 44 may be washed with water to remove aluminum bromide catalyst and hydrogen bromide promoter. The washed mixture is then filtered through clay, such as bentonite, which removes any catalyst and promoter not removed in the washing operation and any impurities such as aluminum hydroxide formed by reaction of the catalyst with water. The filtered mixture is then fractionated for removal of diluent and catalyst solvent. A subsequent distillation, which may be under vacuum or a steam distillation, may be had to remove light polymer product from the desired heavier polymer product.

The following examples will illustrate the results to be obtained by the process of the invention.

*Example I*

In this example, propylene in admixture with normal butane was fed into a continuous olefin polymerization reactor along with aluminum bromide dissolved in normal butane. Hydrogen bromide promoter of commercial grade was also passed into the reactor by being admixed with the entering feed stream of dissolved aluminum bromide. Analysis of this hydrogen bromide disclosed that it contained 1.34% by weight of ferrous bromide. Temperature of the polymerization reaction was maintained at $-30°$ F. and the residence time was 23 minutes. A stream of reaction mixture was continuously drawn from the reactor and the mixture treated for removal of catalyst and promoter, filtered with bentonite clay, flash distilled for removal of normal butane and then steam distilled to recover the desired heavy polymer product from light polymer product. The recovered product had a 210° F. viscosity of 2504 Saybolt Universal seconds and a N. P. A. color of 8.

*Example II*

In this example, the same procedures as in Example I were followed except that the hydrogen bromide promoter, prior to admixing with the feed stream of aluminum bromide catalyst, was subjected to multiple flash distillation in glass equipment substantially as described in connection with the drawing. The polymer product obtained had a 210° F. viscosity of 3751 Saybolt Universal seconds and a N. P. A. color of 1½. It will be seen, therefore, that by the process of the invention, an increase in viscosity of 50% and a decided improvement in the color of the polymer product may be obtained.

Having thus described my invention, it will be understood that such description has been given by way of illustration and example only and not by way of limitation, reference for the latter purpose being had to the appended claim.

I claim:

In a continuous process for effecting the polymerization of propylene, wherein a stream of propylene, a stream of aluminum bromide catalyst dissolved in a non-polymerizing hydrocarbon, and a stream of hydrogen bromide promoter from a source of supply are passed continuously into a polymerization reaction zone; the improvement which comprises passing said continuous stream of hydrogen bromide from said source of supply to a distillation zone, continuously distilling said hydrogen bromide to remove iron bromide therefrom, and passing the distilled hydrogen bromide continuously from said distillation zone into said polymerization reaction zone.

DOMINIC J. ORIOLO.

REFERENCES CITED

The following references are of record in the file of this patent:

UNITED STATES PATENTS

| Number | Name | Date |
|---|---|---|
| 2,382,753 | Treseder | Aug. 14, 1945 |
| 2,411,483 | Wachter et al. | Nov. 19, 1946 |

OTHER REFERENCES

Leighton et al.: "The Catalytic Isomerization of Paraffin Hydrocarbons," Jour. Amer. Chem. Soc., vol. 65, pages 2276-2280.